(12) United States Patent
Borowski et al.

(10) Patent No.: US 11,038,437 B2
(45) Date of Patent: Jun. 15, 2021

(54) AC INVERTER WITH ACTIVE NEUTRAL BALANCE

(71) Applicant: Illinois Tool Works Inc., Glenview, IL (US)

(72) Inventors: James Donald Borowski, Greenville, WI (US); Travis Orvedahl, Neenah, WI (US); Bernard J. Vogel, Troy, OH (US)

(73) Assignee: ILLINOIS TOOL WORKS, Glenview, IL (US)

( * ) Notice: Subject to any disclaimer, the term of this patent is extended or adjusted under 35 U.S.C. 154(b) by 266 days.

(21) Appl. No.: 15/990,009

(22) Filed: May 25, 2018

(65) Prior Publication Data
US 2019/0363643 A1 Nov. 28, 2019

(51) Int. Cl.
| | |
|---|---|
| *B23K 9/10* | (2006.01) |
| *H02M 7/48* | (2007.01) |
| *H02M 7/487* | (2007.01) |
| *H02M 1/08* | (2006.01) |
| *H02M 7/5395* | (2006.01) |
| *H02J 7/00* | (2006.01) |
| *H02M 1/00* | (2006.01) |

(52) U.S. Cl.
CPC .......... *H02M 7/487* (2013.01); *B23K 9/1043* (2013.01); *H02M 1/08* (2013.01); *H02M 7/5395* (2013.01); *H02J 7/0068* (2013.01); *H02M 2001/0009* (2013.01)

(58) Field of Classification Search
CPC .. B23K 9/1043; B23K 9/1056; B23K 9/1062; H02M 1/42; H02M 1/4225; H02M 3/285; H02M 3/3372; H02M 2001/007; H02M 7/5395; H02M 7/0068; H02M 2001/0009
See application file for complete search history.

(56) References Cited

U.S. PATENT DOCUMENTS

| | | | |
|---|---|---|---|
| 5,710,696 | A | 1/1998 | Reynolds |
| 5,783,799 | A | 7/1998 | Geissler |
| 6,087,628 | A | 7/2000 | Ferkel |
| 6,111,217 | A | 8/2000 | Beeson |
| 6,469,401 | B2 | 10/2002 | Beeson |
| 6,674,179 | B2 | 1/2004 | Beeson |
| 6,894,401 | B2 | 5/2005 | Beeson |

(Continued)

OTHER PUBLICATIONS

PCT, Notification of Transmittal of the International Search Report and the Written Opinion of the International Searching Authority, or the Declaration, in Application No. PCT/US2019/024948, dated Jul. 16, 2019.

(Continued)

*Primary Examiner* — Brian W Jennison
(74) *Attorney, Agent, or Firm* — McAndrews, Held & Malloy, Ltd.

(57) ABSTRACT

A welding-type power system that provides balanced split phase AC power or three phase AC power from a DC power bus that includes a power supply, a DC power bus, inverters, and a balancing circuit. The inverters and the balancing circuit are configured in a half-bridge topology. The balancing circuit is configured to balance a neutral midpoint of the DC power bus. The balanced split phase AC power or three phase AC power is accomplished by actively controlling the neutral midpoint of the DC power bus via the balancing circuit.

20 Claims, 3 Drawing Sheets

(56) References Cited

U.S. PATENT DOCUMENTS

| | | | |
|---|---|---|---|
| 7,235,759 B2 | 6/2007 | Geissler | |
| 8,299,398 B2 | 10/2012 | Madsen | |
| 9,837,930 B2 | 12/2017 | Hao | |
| 9,862,052 B2 | 1/2018 | Vogel | |
| 2009/0039063 A1 | 2/2009 | Madsen | |
| 2010/0308026 A1 | 12/2010 | Vogel | |
| 2014/0021180 A1* | 1/2014 | Vogel | B23K 9/1056 |
| | | | 219/130.1 |
| 2014/0104907 A1* | 4/2014 | Shimada | H02M 7/493 |
| | | | 363/80 |
| 2014/0374397 A1 | 12/2014 | Vogel | |
| 2015/0053660 A1 | 2/2015 | Schartner | |
| 2015/0060426 A1 | 3/2015 | Schartner | |
| 2015/0280593 A1* | 10/2015 | Ando | H02M 1/42 |
| | | | 363/17 |
| 2016/0322916 A1* | 11/2016 | Hao | H02M 7/48 |
| 2017/0189986 A1 | 7/2017 | Henry | |

OTHER PUBLICATIONS

PCT, Notification Concerning Transmittal of International Preliminary Report on Patentability, in Application No. PCT/US2019/024948, dated Dec. 10, 2020 (8 pages).

* cited by examiner

AC INVERTER WITH ACTIVE NEUTRAL BALANCE

BACKGROUND

Conventional welding-type power systems provide a welding power output. Some welding-type power systems utilize a direct current (DC) power bus to provide power to a welding power supply to provide a welding power output and to an auxiliary power supply to provide auxiliary outputs. Currently, alternating current (AC) inverters sharing a neutral line are used to provide AC outputs from the DC bus. In the event of an unbalanced load on the auxiliary outputs, the neutral line between the AC outputs may become unbalanced in the absence of a balancing mechanism.

SUMMARY

Apparatus, systems, and methods are disclosed of a welding-type power system including an AC inverter with an active neutral balancing circuit configured to provide balanced split phase AC power or balanced three phase AC power to AC load(s), substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
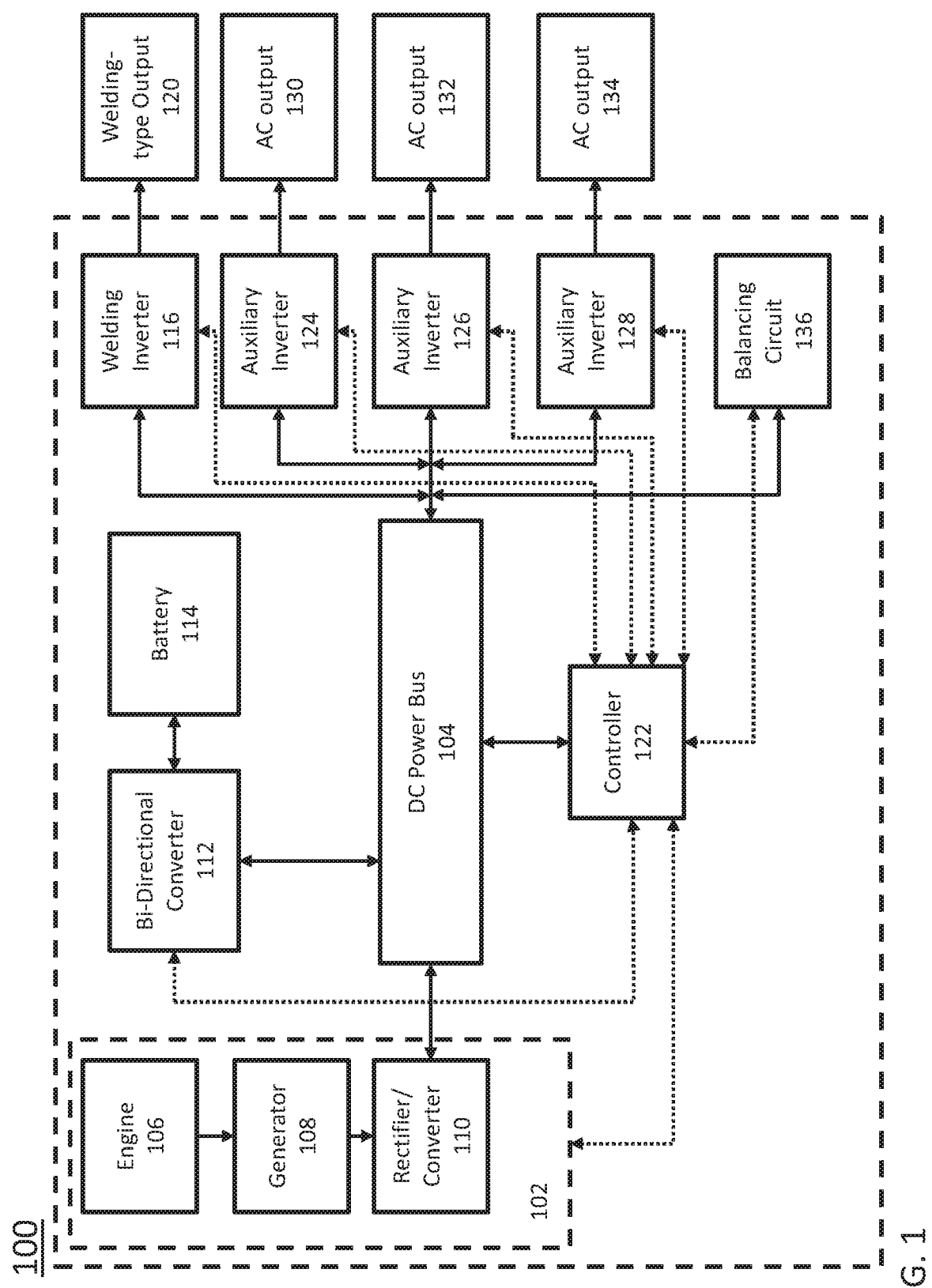
FIG. 1 is a block diagram of an example welding-type power system in accordance with aspects of this disclosure.

The disclosure relates generally to welding systems, and particularly to systems and methods to provide balanced AC output power to AC load(s) from a DC power bus. More particularly, the disclosure relates to producing balanced split phase AC output power from a DC power bus by means of an inverter bridge topology. In some aspects, the disclosure relates to producing balanced three phase AC output power from a DC power bus by means of an inverter bridge topology. Balanced AC power may be accomplished by adding a balancing circuit to control the neutral midpoint of the AC outputs. In some examples, the neutral midpoint of the AC outputs is tied to the center point of a DC power bus, comprised of two capacitors connected in a series arrangement to form a split capacitance. In some examples, the balancing circuit is an active half-bridge circuit. Although described in relation to a welding-type power system, the systems and methods described in this disclosure could be used provide balanced AC output power in any power system that provides AC output power to AC loads from a DC power bus.

Current systems may provide two half-bridge inverters running pulse width modulation (PWM) sinewave sequences to generate two AC outputs out of phase from a center tapped DC power bus. For example, each output may be 115 Volts AC (VAC), such that 230 VAC is seen across the two outputs. A welding inverter may operate off of the same DC bus. In such examples, an unbalanced AC load may cause the relative voltages of the two AC outputs to become unbalanced, which may cause the neutral line to shift to a point that is not midway between the two AC outputs, which is the neutral midpoint of the DC power bus. Unbalanced AC loads may occur for example, when AC loads have a net DC content, such as a half-wave rectifier. In view of the deficiencies in current systems, an improved system or device is needed to balance the neutral midpoint of the DC power bus in the event of an unbalanced AC output.

The present disclosure provides an apparatus, systems, and methods, to balance the neutral midpoint between AC outputs in welding type systems. Advantages of the disclosed apparatus, systems, and methods include the ability to balance a DC power bus midpoint without the need of a center tapped generator or Y-three phase configuration. Further, a single boost circuit can be used to provide power to the DC power bus, rather than a dual boost converter. Another advantage of the present disclosure is that the disclosed system simplifies the required bi-directional converter used to convert power between the bus and an energy storage device in a hybrid power supply system because the bi-directional converter is not required to balance the DC power bus midpoint, because the balancing circuit balances the DC power bus midpoint.

Such a system for providing balanced AC output power from a DC power bus is not necessarily limited to welding-type power systems. For example, the system could be used to provide balanced split phase or three phase power from a DC power bus to any AC output that provides power to a load.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to switched mode power supplies, inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "pulsed welding" or "pulsed MIG welding" refers to techniques in which a pulsed power waveform is generated, such as to control deposition of droplets of metal into the progressing weld puddle.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "modulating" refers to causing a switch to turn on and off multiple times to produce a desired output, such as pulse width modulation, pulsed frequency modulation, hysteretic control, etc.

Disclosed example welding-type power systems include a DC bus having a neutral midpoint; a first half-bridge inverter configured to convert power from the DC bus to a first AC power output coupled to the neutral midpoint; a second half-bridge inverter configured to convert power from the DC bus to a second AC power output coupled to the neutral midpoint, wherein the second AC power output has a phase relationship with the first AC power output; and a balancing circuit configured to provide a balancing output which balances the DC bus neutral midpoint. In some examples, the phase relationship is 0 degrees. In some examples, the phase relationship is 180 degrees. In some examples, the RMS voltage of the first AC power output is substantially equal to the RMS voltage of the second AC power output. In some examples, the RMS voltage of the first AC power output is one of substantially 100, 115, or 230 volts.

In some example welding-type power systems, the first half-bridge inverter includes a first switch and a second switch, the second half-bridge inverter includes a third switch and a fourth switch, and the balancing circuit is a half-bridge circuit including a fifth switch and a sixth switch.

Some example welding-type power systems further include a controller. In some examples, the controller is configured to: monitor one of the DC bus voltage, DC bus midpoint voltage, the first AC power output voltage, or the second AC power output voltage; and adjust duty cycles corresponding to at least one of the first switch, the second switch, the third switch, or the fourth switch to maintain at least one of the magnitude of the first AC power output voltage, the magnitude of the second AC power output voltage, or the phase relationship of the first AC power output and the second AC power output. In some example welding-type power systems, the controller is configured to monitor current through the first half-bridge inverter and current through the second half-bridge inverter; and adjust duty cycles corresponding to at least one of the first switch, the second switch, the third switch, or the fourth switch when current through the first half-bridge inverter or current through the second half-bridge inverter exceeds a threshold value.

In some example welding-type power systems, both the fifth and the sixth switches have adjustable duty cycles. In some example welding-type power systems including a controller, the controller is configured to monitor the current through the balancing circuit; and adjust the duty cycles of at least one of the fifth and the sixth switches when the current through the balancing circuit exceeds a threshold value. In some examples, the duty cycles of the fifth and the sixth switches are substantially equal when the neutral midpoint is half of the DC bus.

In some example welding-type power systems including a controller, the controller is configured to: receive a DC bus midpoint voltage feedback signal indicating whether the DC bus midpoint voltage exceeds a first threshold or is below a second threshold; and modulate the fifth switch if the DC bus midpoint voltage exceeds the first threshold and modulate the sixth switch if the DC bus midpoint voltage is below the second threshold. In some examples, the controller is further configured to monitor the current through the balancing circuit and adjust the modulation of the fifth switch of the sixth switch if the monitored current exceeds a threshold.

Some example welding-type power systems further include a bi-directional converter to convert power between a battery and the DC bus. Some example welding-type power systems further include a welding inverter configured to convert power from the DC bus to a welding-type output.

Disclosed example welding-type power systems include a DC bus having a neutral midpoint; a first half-bridge inverter configured to convert power from the DC bus to a first AC power output coupled to the neutral midpoint; a second half-bridge inverter configured to convert power from the DC bus to a second AC power output coupled to the neutral midpoint; a third half-bridge inverter configured to convert power from the DC bus to a third AC power output coupled to the neutral midpoint; and a balancing circuit configured to provide a balancing output which balances the DC bus neutral midpoint, wherein the first AC output has a first phase relationship with the second AC output, and the first AC output has a second phase relationship with the third AC output. In some examples, the first phase relationship is approximately 120 degrees, and the second phase relationship is approximately 240 degrees. In some examples, the balancing circuit is a half-bridge circuit comprising a first switch and a second switch, and the duty cycles corresponding to the first switch and the second switch are each substantially 50 percent when the neutral midpoint is half of the DC bus.

In some example welding-type power systems the balancing circuit is a half-bridge circuit including a first switch and a second switch, and the first switch and the second switch are off during equilibrium conditions. The welding-type power system further includes a controller, and the controller is configured to: receive a DC bus midpoint voltage feedback signal indicating whether the DC bus midpoint voltage exceeds a first threshold or is below a second threshold; and modulate the first switch if the DC bus midpoint voltage exceeds the first threshold and modulate the second switch if the DC bus midpoint voltage is below the second threshold.

Disclosed example welding-type power systems include a DC bus having a neutral midpoint, a first half-bridge inverter including a first switch and a second switch, the first half-bridge inverter configured to convert power from the DC bus to a first AC power output coupled to the neutral midpoint; a second half-bridge inverter including a third switch and a fourth switch, the second half-bridge inverter configured to convert power from the DC bus to a second AC power output coupled to the neutral midpoint, wherein the second AC power output has a phase relationship with the first AC power output; a balancing circuit including a fifth switch and a sixth switch, the balancing circuit configured to provide a balancing output which balances the DC bus midpoint; and a controller configured to: receive a DC bus midpoint voltage feedback signal; and adjust a modulation of the fifth switch or a modulation of the sixth switch to balance the DC bus neutral midpoint in response to the DC bus midpoint voltage feedback signal. In some examples, the phase relationship is 180 degrees. In some examples, the phase relationship is 0 degrees.

In some example welding-type power systems, the controller is further configured to: determine whether the DC bus midpoint voltage feedback signal indicates that the DC bus midpoint voltage exceeds a first threshold value or is below a second threshold value; adjust the modulation of the fifth switch and the sixth switch when the DC bus midpoint voltage exceeds the first threshold value to decrease the DC bus midpoint voltage; and adjust the modulation of the fifth switch and the sixth switch when the DC bus midpoint voltage is below the second threshold value the increase the DC bus midpoint voltage. In some examples, the controller sets the modulation of one of the first switch, the second switch, the third switch, the fourth switch, the fifth switch, or the sixth switch corresponding to a lookup table of modulation values.

FIG. 1 is a block diagram of a welding-type power system 100. In FIG. 1, solid lines correspond to power connections, and dotted lines correspond to data connections. In some examples, power connections may also carry data. The example power system 100 includes a power supply 102 that feeds a DC power bus (DC bus) 104. In some examples, the power supply 102 may include a variable speed engine 106 connected to an electric generator 108. In some examples, the power supply 102 may feed the DC power bus 104 directly by a rectifier 110. In other examples the power supply 102 may feed the DC power bus 104 by a boost converter 110.

In some examples, a bi-directional converter 112 converts power between the DC power bus 104 and a battery 114, or other energy storage device. In some examples, the DC power bus 104 has a split capacitance, with an auxiliary power circuit deriving power from the DC power bus 104 and having a neutral connection tied to the split capacitance and providing auxiliary power, allowing a user to plug in devices (e.g., lighting, small power tools, etc.) to auxiliary power, while the total DC power bus 104 may feed a welding inverter 116 that supplies a welding-type power output 120. In some examples, the bi-directional converter 112 may be configured to balance a split capacitance DC power bus 104. In some examples, the bi-directional converter 112 may be a 3-level bi-directional converter.

A controller 122 is connected to the power supply 102, the DC power bus 104, the bi-directional converter 112, and the welding inverter 116. The welding inverter 116 provides a welding-type power output 120. The controller 122 is also connected to auxiliary inverters 124, 126, and 128. Auxiliary inverters 124, 126, and 128 generate AC outputs 130, 132, and 134 respectively.

In some examples, as described in more detail below, the auxiliary inverters are half-bridge inverters running PWM sine wave sequences to generate AC outputs. In some examples, there are two auxiliary inverters, 124 and 126, which each generate AC outputs of equal voltages which are out of phase. For example, the outputs from auxiliary inverters 124 and 126 may be 180 degrees out of phase. For example, each auxiliary inverter 124 and 126 may output 115 VAC 180 degrees out of phase, such that 230 VAC would be measured across the outputs of the auxiliary inverters 124 and 126. In some examples, each auxiliary inverter 124 and 126 may output 220 VAC 180 degrees out of phase, such that 440 VAC would be measured across the outputs of the auxiliary inverters 124 and 126. In some examples, each auxiliary inverter 124 and 126 may output 100 VAC 180 degrees out of phase, such that 200 VAC would be measured across the outputs of the auxiliary inverters 124 and 126. In some examples, each auxiliary inverter 124 and 126 may output 230 VAC 180 degrees out of phase, such that 460 VAC would be measured across the outputs of the auxiliary inverters 124 and 126. The auxiliary inverters 124 and 126 share a neutral line.

The welding-type power system 100 also includes a balancing circuit 136. The balancing circuit 136 is also connected to the controller 122. The balancing circuit 136 may be actively controlled to force the neutral line shared by the auxiliary inverters (124 and 126) to be the midpoint between the AC outputs of the auxiliary inverters (124 and 126). The neutral line is connected to the center point of the DC power bus 104, comprised of a split capacitance. When the neutral midpoint is balanced, the center point of the DC power bus 104 should be ½ of the total voltage, VBus, across the DC power bus 104. The neutral midpoint may be connected to chassis, ground, the metal frame of the welding type power system 100, as a return pathway in a completed circuit, etc. In some examples as described in more detail below, the balancing circuit 136 is a half-bridge inverter.

In some examples, the welding type power system 100 includes three auxiliary inverters, 124, 126, and 128, which each generate AC outputs (130, 132, and 134 respectively) of equal voltages which are 120 degrees out of phase (the first AC output 130 is 120 degrees out of phase with the second AC output 132, and the first AC output 130 is 240 degrees out of phase with the third AC output 134). The auxiliary inverters (124, 126, 128) share a neutral line. The welding-type power system 100 also includes a balancing circuit 136. The balancing circuit 136 is actively controlled by the controller 122 to force the neutral line shared by the auxiliary inverters (124, 126, 128) to be the midpoint between the AC outputs of the auxiliary inverters (124, 126, 128). In some examples, the neutral midpoint is controlled to be at a voltage level that is ½ of the total voltage, VBus, across the DC power bus 104.

Figure 2:
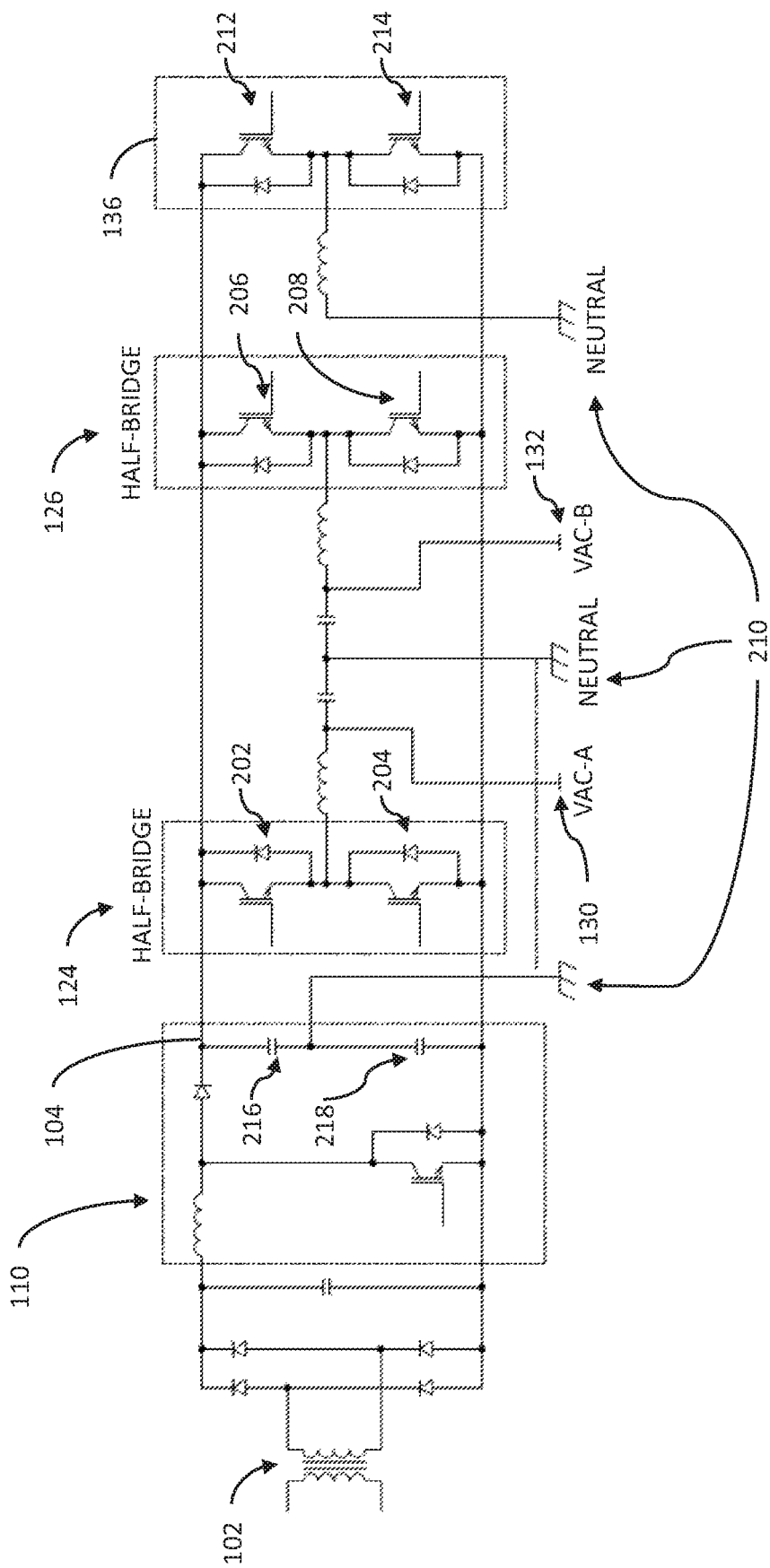
FIG. 2 is a schematic diagram of an example welding-type power system with an active balancing circuit in accordance with aspects of this disclosure.

FIG. 2 is a circuit diagram of an exemplary welding-type power system including a power supply 102, a boost converter 110 to convert power from the power supply 102 to a split capacitance DC power bus 104, a first half-bridge inverter 124, a second half-bridge inverter 126, and a balancing circuit 136. The first half-bridge inverter 124 runs a PWM sine wave sequence to generate a first AC output 130 from the DC power bus 104. The second half-bridge inverter 126 runs a PWM sine wave sequence to generate a second AC output 132 from the DC power bus 104. Each of the first half-bridge inverter 124 and the second half-bridge inverter 126 is connected to a controller 122. The controller 122 controls the duty cycles of the PWM sequences for each of the half-bridge inverters 124 and 126 in order to control the AC outputs 130 and 132. In some examples, the controller 122 may set the duty cycles via a lookup table of duty cycles to achieve the desired sine wave sequence for each AC output 130 and 132. In some examples, the generated AC outputs (130 and 132) operate at 60 Hz. In some examples, the generated AC outputs (130 and 132) operate at 50 Hz.

In some examples, the AC outputs (130 and 132) are of equal magnitude and out of phase, meaning that each AC output is 180 degrees out of phase with the other AC output. When the AC outputs are out of phase, the magnitude of the voltage measured across both AC outputs is twice the magnitude of each AC output. For example, the magnitudes of AC outputs 130 and 132 may each be 115 VAC. If the phases of the AC outputs (130 and 132) are 180 degrees out of phase, a voltage measured across both AC outputs 130 and 132 is 230 VAC. In some examples, the AC outputs 130 and 132 are in phase, such that the phase difference between the AC outputs is 0 degrees. In other examples, the AC outputs 130 and 132 may have any other selected phase relationship.

Each of the half-bridge inverters 124 and 126 comprises two switches. The first half-bridge inverter 124 comprises switches 202 and 204. The second half-bridge inverter 126 comprises switches 206 and 208. The controller 122 may control the duty cycles of each of the switches 202, 204, 206, and 208, to control the PWM sine wave sequences of the first half-bridge 124 inverter and the second half-bridge inverter 126. In some examples the controller 122 may set the duty cycles via a lookup table of duty cycles to achieve the desired sine wave sequence.

The AC outputs 130 and 132 share a neutral midpoint 210, which is also connected to the neutral midpoint 210 of the split capacitance DC power bus 104. If either of the AC outputs (130 or 132) is connected to a load with a net DC content, such as a half-wave rectifier, the neutral midpoint 210 may become unbalanced. This would result in the voltages across the capacitors 216 and 218 of the split capacitance DC power bus 104 being unequal.

To avoid an unbalanced neutral midpoint 210 condition, the output of a balancing circuit 136 is also connected to the neutral midpoint 210 in order to actively balance the neutral midpoint 210 to the midpoint of the voltage across the DC power bus 104 (VBus/2). The balancing circuit 136 has a half-bridge topology, and comprises a first switch 212 and a second switch 214. The balancing circuit 136 is connected to the controller 122. The controller 122 may control the output of the balancing circuit 136 in order to maintain the neutral midpoint 210 at the midpoint of the split capacitance DC power bus 104 (VBus/2). The controller 122 controls the output of the balancing circuit 136 by controlling the modulation applied to each of the first switch 212 and the second switch 214. Modulation includes turning a switch (e.g., switches 212 or 214) on and off. In some examples, modulation includes setting a duty cycle for a switch (e.g., switches 212 or 214). In some examples, modulation includes applying a PWM signal to a switch (e.g., switches 212 or 214). In some examples, modulation includes turning a switch (e.g., switches 212 or 214) on and off repeatedly at a set frequency. In some examples, the controller 122 may use hysteretic control of the modulation of the switches 212 and 214 to balance the neutral midpoint 210 at VBus/2.

In a first aspect, the balancing circuit 136 may operate with complementary PWM signals centered at substantially 50%. In this first aspect, the balancing circuit 136 is always actively balancing the neutral midpoint 210. This aspect provides a natural open loop response that is effective to keep the neutral midpoint 210 of the DC power bus 104 balanced. In some examples, the controller 122 may monitor the total voltage VBus across the split capacitance DC power bus 104 and compare the voltage at the neutral midpoint 210 to VBus/2. In some examples, the controller may receive a DC power bus 104 midpoint feedback signal indicating if the neutral midpoint 210 voltage is within a threshold range of VBus/2. If the voltage at the neutral midpoint 210 is not within a threshold range of VBus/2, then the controller 122 can adjust the PWM signals applied to the balancing circuit 136 to bring the voltage at neutral midpoint 210 to VBus/2. For example, if the voltage at the neutral midpoint 210 is too high, meaning that the voltage at the neutral midpoint is above VBus/2 by a threshold amount, the controller 122 may increase the pulse width of the lower switch 214 and decrease the pulse width of the upper switch 212. Similarly, if the voltage at the neutral midpoint 210 is too low, meaning that the voltage at the neutral midpoint is below VBus/2 by a threshold amount, the controller 122 may increase the pulse width of the upper switch 212 and decrease the pulse width of the lower switch 214. In some examples, the controller 122 may monitor the current through the balancing circuit 136 and reduce the pulse width of both or either switches 212 and 214 if the magnitude of the current through the balancing circuit 136 exceeds a threshold, in order to decrease the magnitude of the current through the balancing circuit 136.

In a second aspect, both switches (212, 214) of the balancing circuit 136 are normally off during equilibrium conditions. An equilibrium condition exists, for example, when the voltage at the neutral midpoint 210 is within a threshold percentage of VBus/2. The controller may receive feedback indicating whether the voltage at the neutral midpoint 210 is within a threshold percentage of VBus/2. For example, the controller 122 may monitor the voltage at neutral midpoint 210 and compare the voltage at neutral midpoint 210 to VBus/2 to determine whether an equilibrium condition exists. In this second aspect, the controller 122 may modulate the upper switch 212 if the neutral midpoint 210 voltage is too low (below VBus/2 by a threshold amount), and the controller 122 may modulate the lower switch 214 if the neutral midpoint 210 voltage is too high (above VBus/2 by a threshold amount). The controller 122 may modulate a switch (e.g., 212 or 214), for example by turning the switch on and then off, turning the switch on and off at a set frequency, applying a PWM signal to the switch, etc. Modulating only the upper switch 212 if the neutral midpoint 210 is too low, for example by applying a PWM signal to the upper switch 212, will raise the neutral midpoint 210 voltage, bringing the neutral midpoint 210 voltage back to VBus/2. Modulating only to the lower switch 214 if the neutral midpoint 210 is too high, for example by applying a PWM signal to the lower switch 214, will lower the neutral midpoint 210, bringing the neutral midpoint 210 back to VBus/2.

In the second aspect, in some examples the controller 122 monitors the neutral midpoint 210 after each duty cycle of the half-bridge inverters 124 and 126 and adjusts the modulation of the switches 212 and 214 as needed to balance the voltage at the neutral midpoint 210 to VBus/2. For example, the controller 122 may adjust the PWM signal applied to switch 212 and/or 214 as needed to balance the neutral midpoint 210 voltage to VBus/2 after each cycle of the half-bridge inverters 124 and 126. In some examples, the controller 122 may monitor the current through the balancing circuit 136 and adjust the modulation applied to both or either switches 212 and 214 if the magnitude of the current through the balancing circuit 136 exceeds a threshold, in order to decrease the magnitude of the current through the balancing circuit 136.

In some examples, in response to determining that the neutral midpoint 210 voltage is too high or too low, the controller 122 may apply a PWM signal to the respective switch 212 or 214 for a predetermined period of time in order to correct the neutral midpoint 210 imbalance. The predetermined period of time may be a number of PWM cycles applied to the balancing circuit 136. In some examples, the predetermined period of time is determined by how much the measured neutral midpoint 210 voltage varies from the VBus/2 balanced point. For example, if the measured neutral midpoint 210 voltage is much below the VBus/2 point, then more PWM cycles will be applied to the first switch 212 of the balancing circuit 136 than if the measured neutral midpoint 210 voltage is closer to the VBus/2 balanced point. Alternatively, the controller 122 may increase the pulse width of the PWM of the first switch 212 or second switch 214 more for a greater detected neutral midpoint 210 voltage variance from VBus/2 than a lesser neutral midpoint 210 voltage variance from the VBus/2 balanced point.

In some examples, in response to determining that the neutral midpoint 210 voltage is too high or too low, the controller 122 may modulate the respective switch 212 or 214, for example by applying a PWM signal to said switch 212 or 214, until the controller 122 determines that the neutral midpoint 210 is within an acceptable threshold of VBus/2.

In some examples, the controller 122 may use hysteretic control to balance the neutral midpoint 210 to VBus/2. When hysteretic control is used, the controller 122 adjusts the qualitative on times of the upper switch 212 and/or the lower switch 214. For example, when hysteretic control is used, to increase the neutral midpoint 210 voltage in response to detecting that the neutral midpoint 210 voltage is below VBus/2, the controller 122 will turn on the upper switch 212 for more time than the lower switch 214 over a given time period. Likewise, to decrease the neutral midpoint 210 voltage in response to detecting that the neutral midpoint 210 voltage exceeds VBus/2, the controller 122 will turn on the lower switch 214 for more total time than the upper switch 212 over a given time period.

In some examples, the controller 122 may also monitor the currents of the AC outputs 130 and 132. If the magnitude of the current of the AC output 130 exceeds a threshold, the controller 122 may reduce the PWM pulse width of switches 202 and/or 204 in order to decrease the AC output 130 current. Similarly, if the magnitude of the current of the AC output 132 exceeds a threshold, the controller 122 may reduce the PWM pulse width of switches 206 and/or 208 in order to decrease the AC output 132 current. If the current through the balancing circuit 136 exceeds a threshold, the controller 122 may reduce the pulse width of switches 212 and 214 in order to reduce the current through the balancing circuit 136.

In some examples, the controller 122 may monitor one of VBus, the DC bus midpoint voltage, the first AC output voltage 130, or the second AC power output voltage 132 to determine if one of the first AC output 130, the magnitude of the second AC output 132, or the phase relationship between the AC outputs (130 and 132) is outside of a threshold acceptable range. In response to determining that one of the first AC output 130, the magnitude of the second AC output 132, or the phase relationship between the AC outputs (130 and 132) is outside an acceptable threshold range, the controller 122 may adjust the pulse widths of any of the switches 202, 204, 206, or 208 to maintain the magnitude of the first AC output 130, the magnitude of the second AC output 132, or the phase relationship between the AC outputs (130 and 132). The controller 122 may adjust the pulse widths of switches 202-208 via a lookup table of duty cycles.

Figure 3:
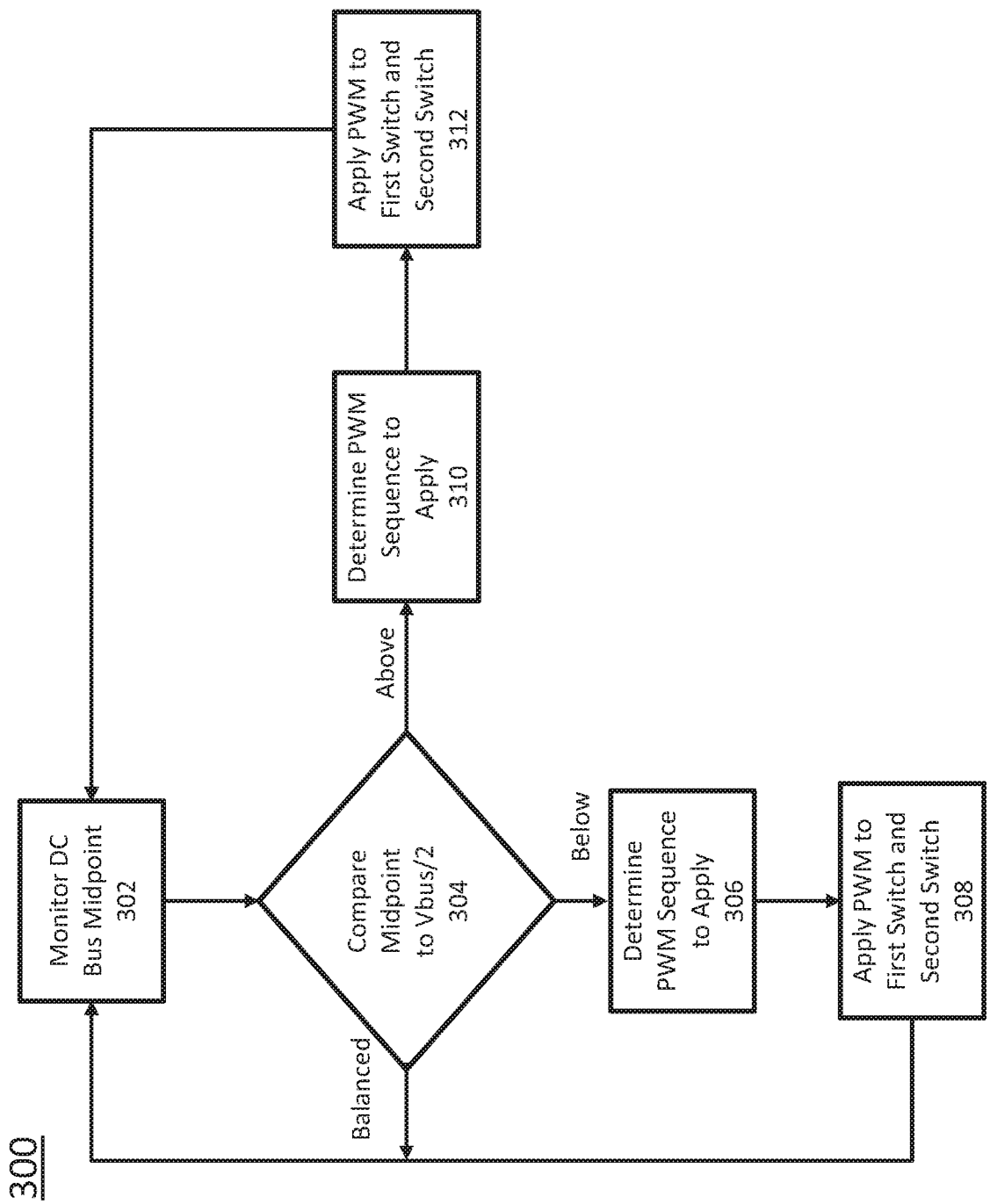
FIG. 3 is flow chart of an exemplary method of operating an active balancing circuit in accordance with aspects of this disclosure.

FIG. 3 shows a flow chart of an exemplary method 300 to actively balance the DC power bus 104 midpoint 210 in accord with the systems described above. At block 302, the controller 122 measures the voltage at the midpoint 210 of the DC power bus 104. At block 304, the controller 122 compares the measured voltage at the midpoint 210 to VBus/2. In some examples, the controller 122 may measure the voltage across the DC power bus 104, and compare the measured voltage across the DC power bus 104 to the measured voltage at the midpoint 210. In some examples, the value of VBus may be programmed into memory of the controller 122, and the controller 122 may compare the measured voltage at the midpoint 210 to the programmed VBus value.

If the measured voltage is balanced, meaning that the measured voltage at the DC power bus midpoint 210 is within a threshold amount of VBus/2, then the controller 122 returns to block 302 to again monitor the voltage at the midpoint 210. In some examples, the controller 122 monitors the voltage at the DC power bus midpoint 210 after each PWM cycle of the inverters (124, 126, 128). In some examples if the measured voltage is balanced, then the PWM signals applied to the first switch 212 and second switch 214 will remain at substantially 50% in a complementary arrangement. In some examples if the measured voltage is balanced then the first switch 212 and second switch 214 will remain off.

If the measured voltage is too low, meaning that the voltage at the DC power bus midpoint 210 is less than VBus/2 by a threshold amount, the controller 122 proceeds to block 306. At block 306, the controller 122 determines how much below VBus/2 the measured midpoint 210 voltage was. The controller 122 determines the PWM signals such that the duty cycle of the PWM signal to apply to the first switch 212 is increased and the duty cycle of the PWM signal to apply to the second switch 214 is decreased, and the controller 122 determines the number of cycles to apply the PWM signals to the first switch 212 and second switch 214. In some examples, the duty cycle to apply to the second switch 214 may be set to zero, meaning the switch 214 may remain off. At block 308, the controller 122 applies the PWM signals to the first switch 212 and second switch 214, which increases the voltage at the midpoint 210. Increasing the voltage at the midpoint 210 balances the midpoint because at block 304 the controller 122 determined that the voltage at the midpoint was too low. After applying the PWM signals at block 308, the controller 122 returns to block 302 and monitors DC power bus midpoint 210 voltage.

If the measured voltage is too high, meaning that the voltage at the DC power bus midpoint 210 is more than VBus/2 by a threshold amount, the controller 122 proceeds to block 310. At block 310, the controller 122 determines how much above VBus/2 the measured midpoint 210 voltage was. The controller 122 determines PWM signals such that the duty cycle of the PWM signal to apply to the second switch 214 is increased and the duty cycle of the PWM signal to apply to the first switch 212 is decreased, and the controller 122 determines the number of cycles to apply the PWM signals to the first switch 212 and second switch 214. In some examples, the duty cycle to apply to the first switch 212 may be set to zero, meaning the switch 212 may remain off. At block 312, the controller 122 applies the PWM signals to the first switch 212 and the second switch 214, which decreases the voltage at the midpoint 210. Decreasing the voltage at the midpoint 210 balances the midpoint because at block 304 the controller 122 determined that the voltage at the midpoint was too high. After applying the PWM signals at block 312, the controller 122 returns to block 302 and monitors DC power bus midpoint 210 voltage.

As described above in relation to FIG. 1, in some examples the welding type power system may comprise three auxiliary inverters 124, 126, and 126 each producing AC outputs (130, 132, and 134 respectively). In such examples, each of the auxiliary inverters 124, 126, and 128 may be a half-bridge inverter connected to a controller 122, similar to the circuit described in relation to FIG. 2. In such examples, each of the half-bridge inverters 124, 126, and 128 runs a PWM sine wave to generate an AC output (130, 132, and 134 respectively). Each of the AC outputs is 120 degrees out of phase with the other AC outputs. Each of the AC outputs (130, 132, and 134) shares a neutral line connected to a neutral midpoint 210. As described above, a balancing circuit 136 may actively balance the neutral midpoint 210 to account for any DC distortion on the AC outputs (130, 132, and 134) that may cause the neutral midpoint 210 of the DC power bus 104 to become unbalanced.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system comprising:
   a DC bus having a neutral midpoint;
   a first half-bridge inverter configured to convert power from the DC bus to a first AC power output coupled to the neutral midpoint;
   a second half-bridge inverter configured to convert power from the DC bus to a second AC power output coupled to the neutral midpoint, wherein the second AC power output has a phase relationship with the first AC power output;
   a balancing circuit configured to provide a balancing output which balances the DC bus neutral midpoint, wherein the balancing circuit is a half-bridge circuit comprising a first switch and a second switch; and
   a controller configured to:
     receive a DC bus midpoint voltage feedback signal indicating whether the DC bus midpoint voltage exceeds a first threshold or is below a second threshold; and
     modulate the first switch if the DC bus midpoint voltage exceeds the first threshold and modulate the second switch if the DC bus midpoint voltage is below the second threshold.

2. The welding-type power system of claim 1, wherein the phase relationship is one of 0 or 180 degrees.

3. The welding-type power system of claim 2, wherein the RMS voltage of the first AC power output is substantially equal to the RMS voltage of the second AC power output.

4. The welding-type power system of claim 3, wherein the RMS voltage of the first AC power output is one of substantially 100, 115, or 230 volts.

5. The welding-type power system of claim 1, wherein the first half-bridge inverter comprises a third switch and a fourth switch, and the second half-bridge inverter comprises a fifth switch and a sixth switch.

6. The welding-type power system of claim 5, further comprising a controller configured to:
   monitor one of the DC bus voltage, DC bus midpoint voltage, the first AC power output voltage, or the second AC power output voltage; and
   adjust duty cycles corresponding to at least one of the third switch, the fourth switch, the fifth switch, or the sixth switch to maintain at least one of the magnitude of the first AC power output voltage, the magnitude of the second AC power output voltage, or the phase relationship of the first AC power output and the second AC power output.

7. The welding-type power system of claim 6, wherein the controller is further configured to:
   monitor current through the first half-bridge inverter and current through the second half-bridge inverter; and
   adjust duty cycles corresponding to at least one of the third switch, the fourth switch, the fifth switch, or the sixth switch when current through the first half-bridge inverter or current through the second half-bridge inverter exceeds a threshold value.

8. The welding-type power system of claim 1, wherein both the first switch and the second switch have an adjustable duty cycle, the welding-type power system further comprising a controller configured to:
monitor current through the balancing circuit; and
adjust the duty cycles of at least one of the first and the second switches when the current through the balancing circuit exceeds a threshold value.

9. The welding-type power system of claim 8, wherein the duty cycles of the first and the second switches are substantially equal when the neutral midpoint is half of the DC bus.

10. The welding-type power system of claim 1, wherein the first switch and the second switch are off during equilibrium conditions.

11. The welding-type power system of claim 10 wherein the controller is further configured to monitor the current through the balancing circuit and adjust the modulation of the first switch or the second switch if the monitored current exceeds a threshold.

12. The welding-type power system of claim 1, further comprising at least one of:
a bi-directional converter to convert power between a battery and the DC bus; or
a welding inverter configured to convert power from the DC bus to a welding-type output.

13. A power system comprising:
a DC bus having a neutral midpoint;
a first half-bridge inverter configured to convert power from the DC bus to a first AC power output coupled to the neutral midpoint;
a second half-bridge inverter configured to convert power from the DC bus to a second AC power output coupled to the neutral midpoint;
a third half-bridge inverter configured to convert power from the DC bus to a third AC power output coupled to the neutral midpoint; and
a balancing circuit configured to provide a balancing output which balances the DC bus neutral midpoint,
wherein the first AC power output has a first phase relationship with the second AC power output, and the first AC power output has a second phase relationship with the third AC power output.

14. The power system of claim 13, wherein the first phase relationship is approximately 120 degrees, and the second phase relationship is approximately 240 degrees.

15. The power system of claim 14, wherein the balancing circuit is a half-bridge circuit comprising a first switch and a second switch, and wherein duty cycles corresponding to the first switch and the second switch are each substantially 50 percent when the neutral midpoint is half of the DC bus.

16. The power system of claim 14, wherein the balancing circuit is a half-bridge circuit comprising a first switch and a second switch, and the first switch and the second switch are off during equilibrium conditions, the power system further comprising a controller, the controller configured to:
receive a DC bus midpoint voltage feedback signal indicating whether the DC bus midpoint voltage exceeds a first threshold or is below a second threshold; and
modulate the first switch if the DC bus midpoint voltage exceeds the first threshold and modulate the second switch if the DC bus midpoint voltage is below the second threshold.

17. A power system comprising:
a DC bus having a neutral midpoint;
a first half-bridge inverter comprising a first switch and a second switch, the first half-bridge inverter configured to convert power from the DC bus to a first AC power output coupled to the neutral midpoint;
a second half-bridge inverter comprising a third switch and a fourth switch, the second half-bridge inverter configured to convert power from the DC bus to a second AC power output coupled to the neutral midpoint, wherein the second AC power output has a phase relationship with the first AC power output;
a balancing circuit comprising a fifth switch and a sixth switch, the balancing circuit configured to provide a balancing output which balances the DC bus midpoint; and
a controller configured to:
receive a DC bus midpoint voltage feedback signal;
determine whether the DC bus midpoint voltage feedback signal indicates that the DC bus midpoint voltage exceeds a first threshold value or is below a second threshold value;
adjust a modulation of the fifth switch and the sixth switch when the DC bus midpoint voltage exceeds the first threshold value to decrease the DC bus midpoint voltage; and
adjust the modulation of the fifth switch and the sixth switch when the DC bus midpoint voltage is below the second threshold value to increase the DC bus midpoint voltage.

18. The power system of claim 17, wherein the phase relationship is one of 0 or 180 degrees.

19. The power system of claim 17, wherein the controller sets the modulation of one of the first switch, the second switch, the third switch, the fourth switch, the fifth switch, or the sixth switch corresponding to a lookup table of modulation values.

20. The power system of claim 18, wherein the controller is configured to:
monitor current through the balancing circuit; and
adjust the duty cycles of at least one of the fifth and the sixth switches when the current through the balancing circuit exceeds a threshold value.

* * * * *